United States Patent [19]
Park et al.

[11] Patent Number: 5,735,138
[45] Date of Patent: Apr. 7, 1998

[54] REFRIGERATOR

[75] Inventors: Suck Haong Park; Yong Myoung Kim, both of Suwon, Rep. of Korea

[73] Assignee: Samsung Electronics Co., Ltd., Suwon, Rep. of Korea

[21] Appl. No.: 716,377

[22] PCT Filed: Jun. 29, 1995

[86] PCT No.: PCT/KR95/00082

§ 371 Date: Sep. 19, 1996

§ 102(e) Date: Sep. 19, 1996

[87] PCT Pub. No.: WO96/02800

PCT Pub. Date: Feb. 1, 1996

[30] Foreign Application Priority Data

| Jul. 19, 1994 | [KR] | Rep. of Korea | 1994/17421 |
| Jul. 19, 1994 | [KR] | Rep. of Korea | 1994/17422 |
| Jul. 19, 1994 | [KR] | Rep. of Korea | 1994/17423 |
| Jul. 19, 1994 | [KR] | Rep. of Korea | 1994/17424 |
| Jul. 19, 1994 | [KR] | Rep. of Korea | 1994/17425 |
| Jul. 19, 1994 | [KR] | Rep. of Korea | 1994/17428 |
| Jul. 19, 1994 | [KR] | Rep. of Korea | 1994/17429 |
| Jul. 19, 1994 | [KR] | Rep. of Korea | 1994/17430 |
| Jul. 20, 1994 | [KR] | Rep. of Korea | 1994/17514 |
| Jul. 20, 1994 | [KR] | Rep. of Korea | 1994/17515 |
| Dec. 10, 1994 | [KR] | Rep. of Korea | 1994/33558 |

[51] Int. Cl.$^6$ .............. F25D 19/00; F25D 17/06

[52] U.S. Cl. .............. 62/455; 62/419

[58] Field of Search .............. 62/404, 407, 408, 62/419, 426, 441, 454, 455

[56] References Cited

U.S. PATENT DOCUMENTS

| 2,390,630 | 12/1945 | Wheller | 454/285 |
| 3,623,419 | 11/1971 | Taylor | 454/285 |
| 4,920,765 | 5/1990 | McCauley et al. | 62/408 |
| 5,315,846 | 5/1994 | Lee | 62/419 |
| 5,369,963 | 12/1994 | Pickles et al. | 62/408 |
| 5,433,661 | 7/1995 | Kim | 454/285 |

FOREIGN PATENT DOCUMENTS

| 0 298 349 | 1/1989 | European Pat. Off. |
| 0 345 437 | 12/1989 | European Pat. Off. |
| 2 422 038 | 11/1974 | Germany |
| 32 10 423 | 10/1983 | Germany |
| 42 13 564 | 10/1993 | Germany |
| 402272281 | 11/1990 | Japan | 62/455 |

*Primary Examiner*—William Doerrler
*Attorney, Agent, or Firm*—Burns, Doane, Swecker & Mathis, L.L.P.

[57] ABSTRACT

A refrigerator includes separate freezing and refrigerating compartments, each having is own evaporator and air circulating fan. The evaporator and fan of the refrigerating compartment are mounted to a housing that is attached to a rear wall of the refrigerator. The housing includes an air inlet and an air outlet, the outlet including vertically spaced openings. A blade is mounted in the housing and is driven about a vertical axis for distributing cool air to the outlet openings.

10 Claims, 17 Drawing Sheets

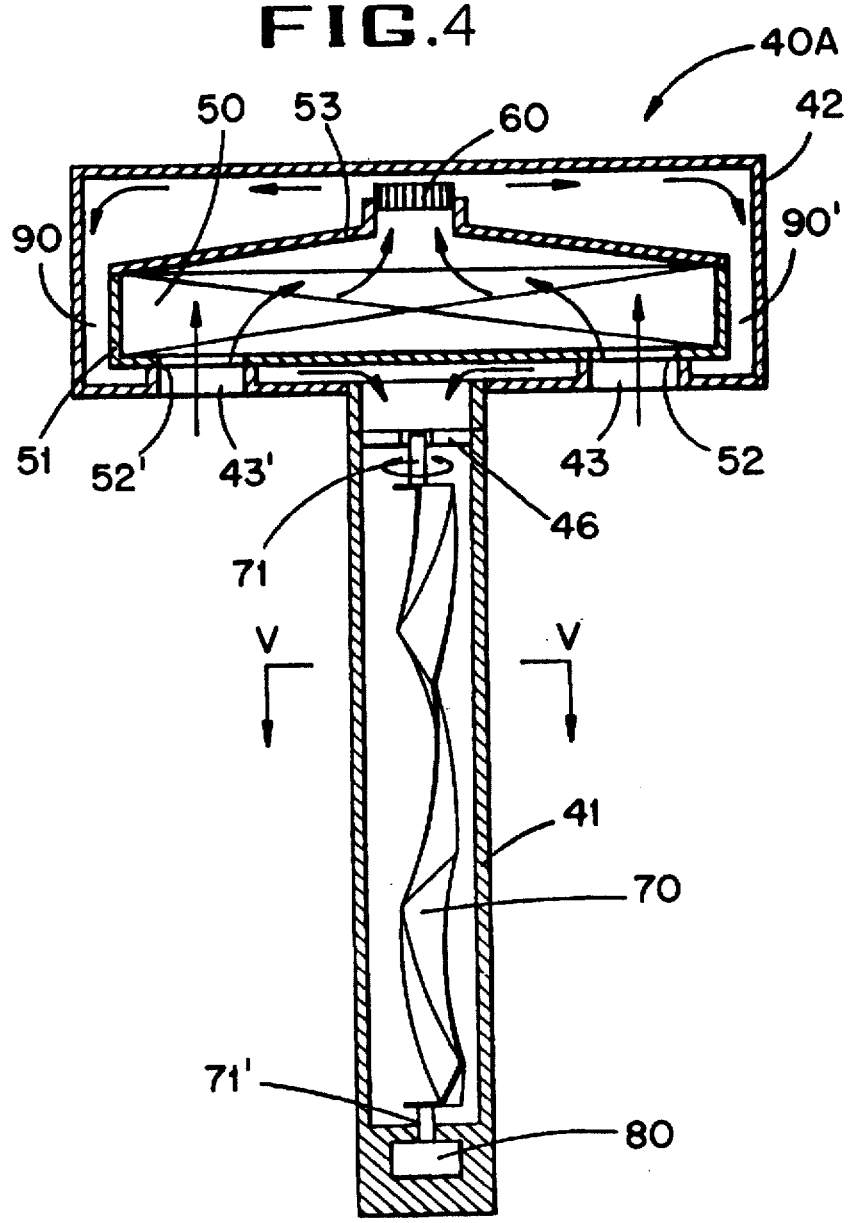

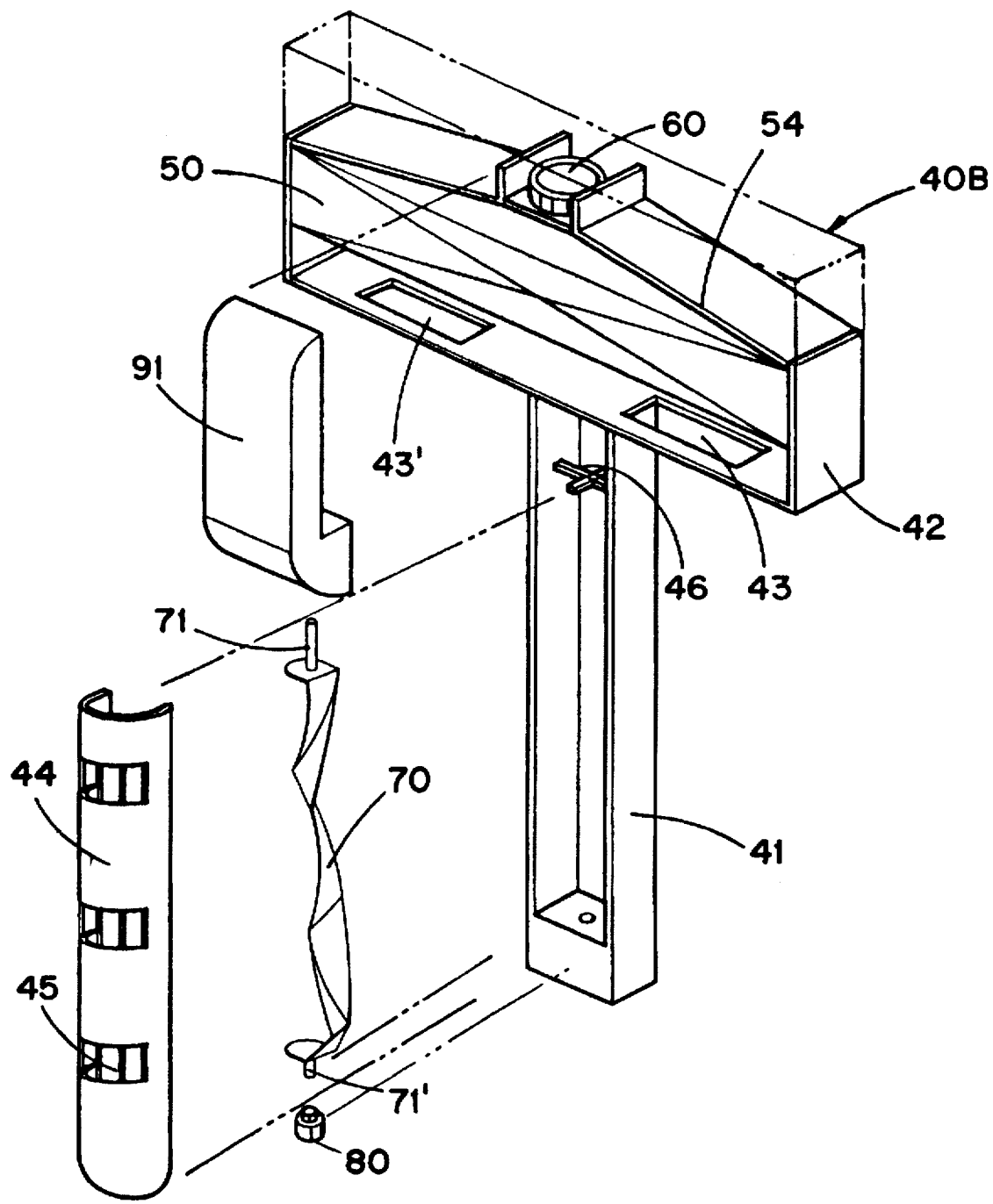

REFRIGERATOR

BACKGROUND OF THE INVENTION

This invention relates to a refrigerator, and more particularly, to a cool-air circulating apparatus for a refrigerating compartment provided on the rear wall of a refrigerating compartment which uniformly cools the whole space of a refrigerating compartment.

A conventional refrigerator, as shown in FIG. 1, includes a refrigerator body 4, a freezing compartment 2, a refrigerating compartment 3, a freezing compartment door 5, and a refrigerating compartment door 6. The doors 5,6 are placed on the front of the refrigerator body 4 for opening/closing the freezing and refrigerating compartments 2 and 3, respectively.

The freezing and refrigerating compartments 2 and 3 are separated by means of a intermediate wall 1. Provided on the rear wall of the freezing compartment 2 are an evaporator 7 for generating cool air, and a fan 8 for discharging the generated cool air into the freezing and refrigerating compartments 2 and 3.

A duct 2a for the freezing compartment 2 is disposed on the rear side of the freezing compartment 2, and a duct 3a for the refrigerating compartment 3 is disposed on the rear side of the refrigerating compartment 3. A plurality of cool-air discharge holes 2b and 3b are formed in an up-and-down direction on the ducts 2a and 3a, respectively, so that the cool air from the evaporator 7 can be introduced into the freezing and refrigerating compartments 2 and 3.

A first passage 1a and a second passage 1b are formed longitudinally inside the intermediate wall 1 in order to guide the cool air, which has circulated in the freezing and refrigerating compartments 2 and 3, into the evaporator 7. On the upper portion of the duct 3a of the refrigerating compartment 3, a damper 3c is provided to control amount of cool air flowing into the refrigerating compartment 3.

A plurality of shelves 3d are arranged in the refrigerating compartment 3, each of which corresponds to each cool-air discharge hole 3b. The refrigerating compartment 3 is sectioned off into several areas by means of the shelves 3d. Numerals 3e and 9 indicate a vegetable box and compressor, respectively.

In the refrigerator, constructed as previously mentioned, a portion of the cool air generated by the evaporator 7 flows into the freezing compartment 2 through the cool-air discharge holes 2b and then circulates within the freezing compartment 2. The cool air then flows into the evaporator 7 again through the first passage 1a. On the other hand, the remnants of the cool air flow into the refrigerating compartment 3 through the cool-air discharge holes 3b and then circulate in the refrigerating compartment 3. The cool air then flows into the evaporator 7 again through the second passage 1b.

However, a conventional refrigerator is constructed such that cool air is generated and supplied to the freezing and refrigerating compartments 2 and 3 by means of an evaporator 7 and a fan 8, and that fan 8 is disposed adjacent to the duct 2a for the freezing compartment 2. Consequently, cool air is sufficiently supplied to the freezing compartment 2, but insufficiently supplied to the refrigerating compartment 3.

The above demerit is more problematic in large-sized refrigerators. That is, in the case of a refrigerator of large dimensions, it is more difficult to send cool air to the refrigerating compartment 3 abundantly because the volume of the refrigerating compartment 3 is relatively large.

Accordingly, in order to supply sufficient cool air to each compartment of such a large-sized refrigerator, the capacity of the evaporator 7 and fan 8 must be larger, relative to the larger dimensions of the refrigerator, and consequently they occupy as much space in the refrigerator.

Further, the conventional refrigerator has another demerit in that cool air is not evenly distributed throughout the space of the refrigerating compartment 3. This is because the duct 3a for the refrigerating compartment 3 consists of only the cool-air discharge holes 3b formed in an up-and-down direction on the front of the duct 3a. That is, the cool-air discharge holes 3b are formed vertically to the downward flow direction of the cool air in the duct 3a, and so most of the cool air discharges through the lower cool-air discharge holes, while only a little cool air discharges through the upper cool-air discharge holes.

As a result, the foodstuffs on the upper shelves of the refrigerating compartment 3 will not maintain a proper refrigerating temperature, whereas the foodstuffs on the lower shelves are overcooled, and thus spoiling storage of the fresh foodstuffs.

It is accordingly an object of this invention to provide a cool-air circulating apparatus for a refrigerator which can supply sufficient amount of cool air to the refrigerating compartment, thereby maintaining the foodstuff's freshness.

It is another object of this invention to provide a cool-air circulating apparatus for a refrigerator which can evenly distribute cool air throughout the space of the refrigerating compartment, thereby uniformly cooling the foodstuffs.

SUMMARY OF THE INVENTION

In a refrigerator according to this invention, the freezing and refrigerating compartments are completely separated from each other by means of an intermediate wall, and individual cool-air circulating systems are provided for supplying cool air to the compartments. That is, the refrigerator according to this invention comprises; a freezing and refrigerating compartment separated from each other by means of an intermediate wall formed on the refrigerator body; an evaporator and fan mounted on the rear side of the freezing compartment for circulating cool air into the freezing compartment; a freezing compartment door and refrigerating compartment door mounted on the front of each compartment for opening/closing the freezing and refrigerating compartments; and a cool-air circulating apparatus, which is characteristic of this invention, mounted on the rear wall of the refrigerating compartment for circulating cool air to the refrigerating compartment.

The cool-air circulating apparatus, which is formed as one housing construction, comprises an air suction member extending outward horizontally and a cool-air discharge member extending downwards from the middle of the air suction member.

The air suction member includes at least one or more air suction opening(s) formed on the surface thereof, and a fan, and at least one or more evaporator(s) mounted on the interior thereof. The cool-air discharge member includes a grille mounted on the front thereof, and a blade disposed lengthwise in the interior thereof. The grille has a plurality of cool-air discharge openings formed in an up-and down direction on the front of the grille.

Accordingly, the air in the refrigerating compartment is introduced into the air suction member through the air suction opening(s) by the operation of the fan and cooled when passed through the evaporator(s). The cooled air then flows to the cool-air discharge member and is evenly distributed again, by the rotation of the blade, into the refrigerating compartment through the cool-air discharge openings.

The cool-air circulating apparatus of this invention has various constructions depending on the arrangement of the fan, the number of the air suction openings and evaporators, etc.

In the first construction, the evaporator, which is disposed in the air suction member, is surrounded by an evaporator cover disposed within a space created inside the air suction member. A couple of air suction openings are connected to the right and left sides of the lower wall of the evaporator cover from the right and left sides of the lower wall of the air suction member. A fan is disposed on the upper portion of the evaporator cover. The air suction member is connected with the cool-air discharge member through a space formed between the evaporator cover and the air suction member.

In the second construction, the evaporator is disposed under a partition plate, which divides the air suction member into upper and lower portions. A couple of air suction openings are formed on the right and left sides of the lower wall of the air suction member. The fan is disposed in the middle of the partition plate. The air suction member communicates with the cool-air discharge member by a guide channel, which is connected to the upper portion of the cool-air discharge member from the upper portion of the air suction member.

In the third construction, the evaporator is disposed on either one of the right or left side of the air suction member. The air suction opening is formed on the lower wall of the air suction member, of which the evaporator is disposed. The fan is disposed on the opposite side of the evaporator in the air suction member. An air guider extends to the upper end of the cool-air discharge member from the upper end of the air suction member. The air guider curves toward the opposite side to the evaporator. The fan is surrounded by the air guider.

The fourth construction is the same as the third construction, with the exception of a couple of air suction openings formed on the right and left sides of the lower wall of the air suction member.

In the fifth construction, the cool-air discharge member extends upwards to the upper portion of the air suction member and divides the air suction member into two sections. A cool-air inflow opening is formed on the top end of the cool-air discharge member. The air suction member is divided into right and left sections by the upper portion of the cool-air discharge member. A couple of evaporators are individually disposed on the right and left sections of the air suction member. A couple of air suction openings are formed on each lower wall of the right and left sections of the air suction member. The fan is disposed in the cool-air inflow opening.

The sixth construction is the same as the fifth construction, except for a couple of air suction openings formed on each side wall of the right and left sections of the air suction member.

This invention has another construction in which a couple of evaporators are mounted individually away from each other in the right and left sections of the air suction member, as in the fifth and sixth constructions, while still connected to each other by means of a joint refrigerant tube.

As described above, the cool-air circulating apparatuses, according to this invention, consist of an integrated housing construction in which the evaporator(s), fan, and blade are mounted in order to provide a cool-air circulation cycle. In the cool-air circulation cycle, the air in the refrigerating compartment is introduced and cooled through any one of the cool-air circulating apparatuses, and then discharged again into the refrigerating compartment.

BRIEF DESCRIPTION OF THE DRAWINGS

FIG. 4 is a longitudinal cross-sectional view of the cool-air circulating apparatus in FIG. 3;

FIG. 6 is an exploded perspective view showing a cool-air circulating apparatus according to the second embodiment of this invention;

DESCRIPTION OF THE PREFERRED EMBODIMENTS

Figure 1:
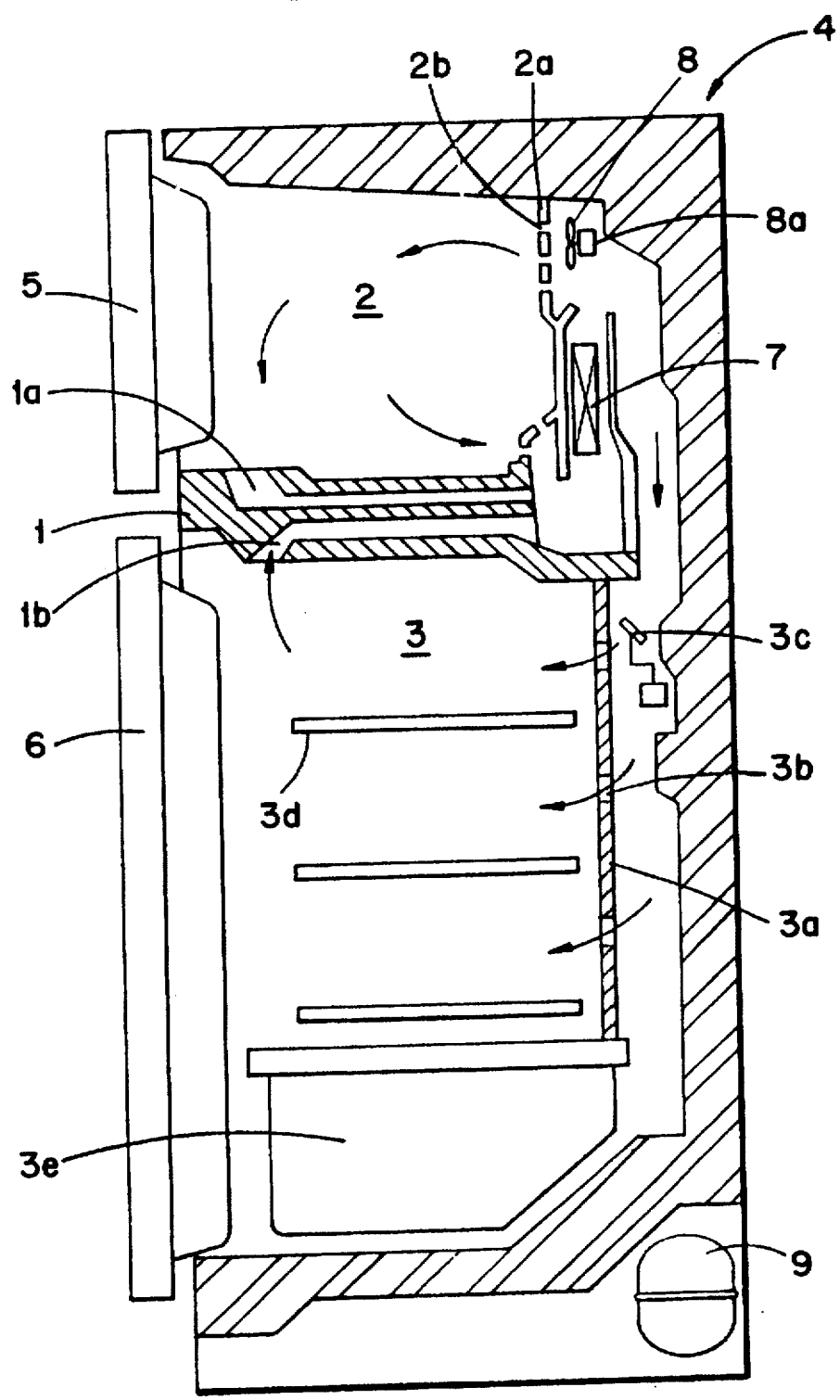
FIG. 1 is a longitudinal cross-sectional view showing the internal construction of a conventional refrigerator.
Figure 2:
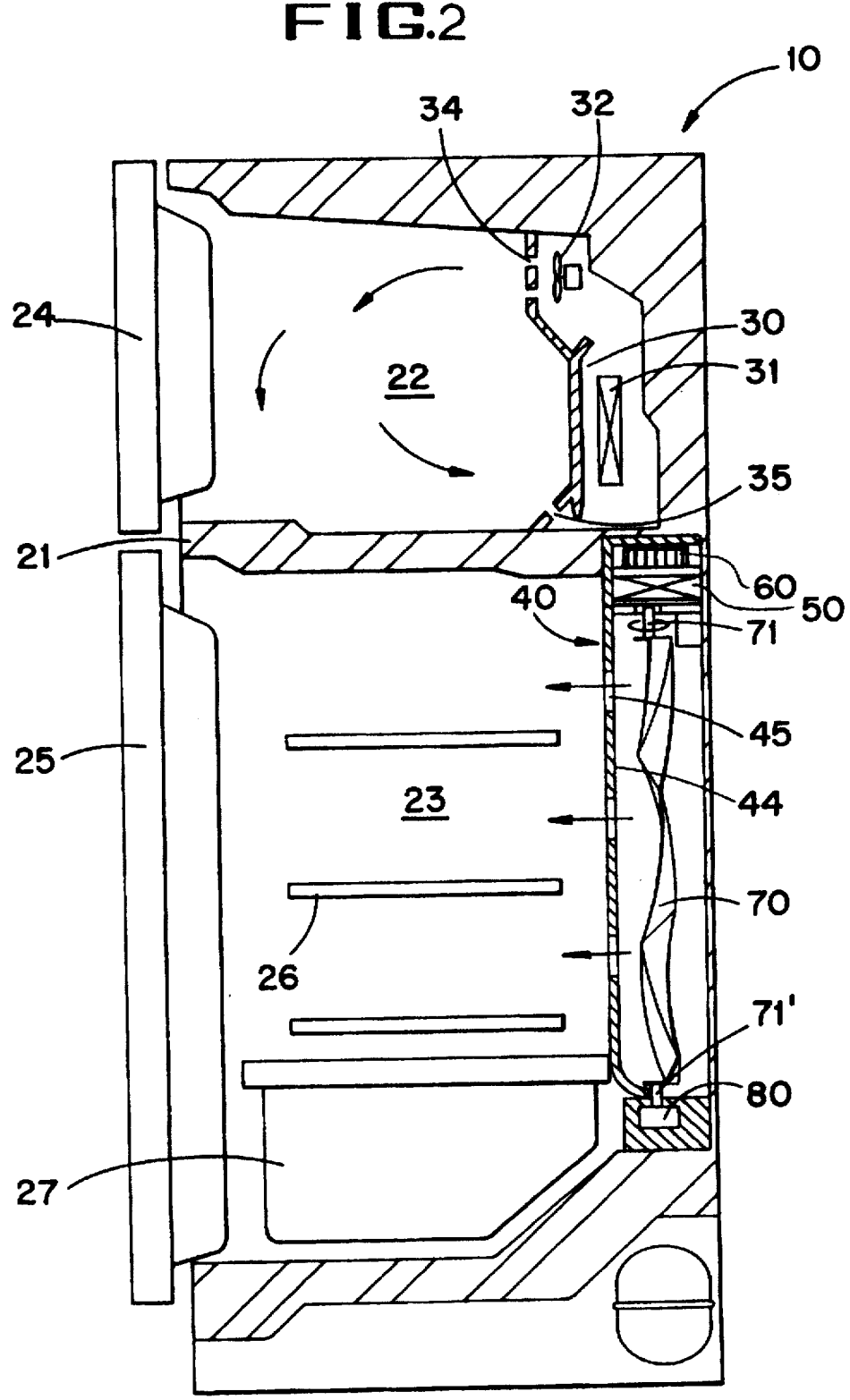
FIG. 2 is a longitudinal cross-sectional view showing the internal construction of a refrigerator according to this invention.

FIG. 2 shows a longitudinal cross-sectional view of a refrigerator to which this invention is adapted.

The refrigerator consists of a body 10 which comprises an intermediate wall 21, a freezing compartment 22 formed on top of the intermediate wall 21, and a refrigerating compartment 23 formed underneath the intermediate wall 21.

In the front of the freezing and refrigerating compartments 22,23, a freezing compartment door 24 and a refrigerating compartment door 25 are mounted for opening/closing the freezing and refrigerating compartments 22,23, respectively. A duct 30 for the freezing compartment 22 is mounted on the rear side of the freezing compartment 22. The duct 30 includes cool-air discharge holes 34 and air suction holes 35 in its upper and lower portions. In the duct 30, an evaporator 31 is mounted adjacent to the air suction holes 35, and a fan 32 is mounted adjacent to the cool-air discharge holes 34. Through the operation of the fan 32 and evaporator 31, the air in the freezing compartment 22 is inhaled, and cooled in the duct 30, through the air suction holes 35. It is then discharged again into the freezing compartment 22 through the cool-air discharge holes 34, maintaining the foodstuffs in frozen state.

In the refrigerating compartment 23, a plurality of shelves 26 are provided to store foodstuffs efficiently. A vegetable box 27 is mounted on the lower portion of the refrigerating compartment 23. Cool-air circulating apparatuses 40, according to various embodiments of this invention, are mounted on the rear wall of the refrigerating compartment 23 for supplying cool air into the refrigerating compartment 23.

As described above, in the refrigerator to which this invention is adapted, the freezing and refrigerating compartments 22,23 are completely separated by means of the intermediate wall 21, and have individual cool-air circulating systems.

Figure 3:
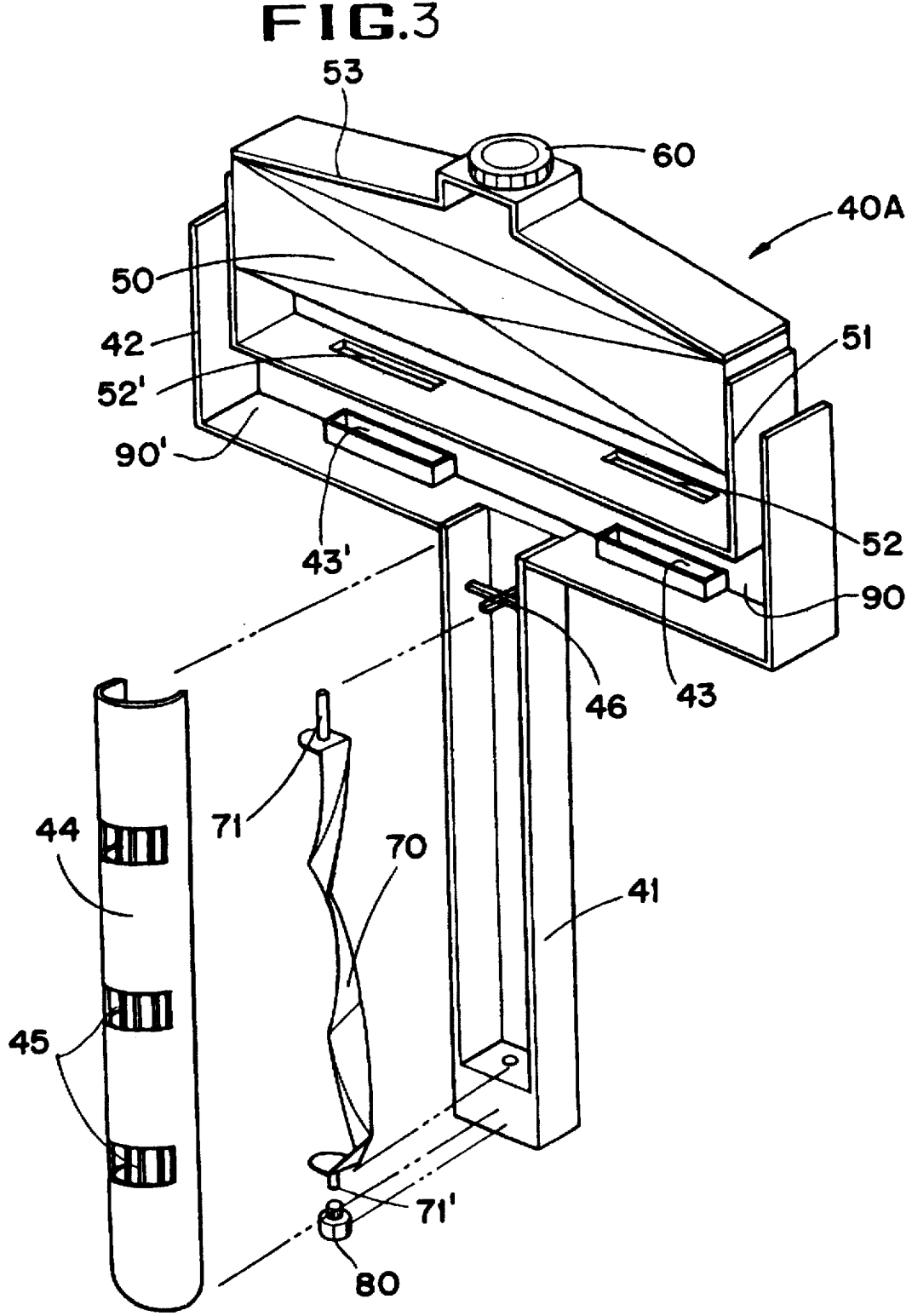
FIG. 3 is an exploded perspective view showing a cool-air circulating apparatus according to the first embodiment of this invention.

FIGS. 3 and 4 show a cool-air circulating apparatus 40A according to the first embodiment of this invention.

As shown in FIG. 3, the cool-air circulating apparatus 40A, which is mounted on the rear wall of the refrigerating compartment 23, forms a housing construction of a 'T' shape. The cool-air circulating apparatus 40A comprises an air suction member 42 and a cool-air discharge member 41.

The air suction member 42 is formed horizontally in the upper portion of the cool-air circulating apparatus 40A. The cool-air discharge member 41 extends downward from the middle of the air suction member 42.

As shown in FIG. 4, the air suction member 42 has a closed construction with upper and lower walls, front and rear walls, and right and left walls. On the right and left sides of the lower wall of the air suction member 42, first and second air suction openings 43,43' are formed for receiving air from the refrigerating compartment 23. The first and second air suction openings 43,43' are projected upwards toward the interior of the air suction member 42 forming a short channel.

An evaporator cover 51 of a box shape is provided in the air suction member 42. A space is created between the evaporator cover 51 and the air suction member 42. On the right and left sides of the lower wall of the evaporator cover 51, first and second insert holes 52,52' are formed for receiving the first and second air suction openings 43,43' A fan 60 is disposed in the top center of the evaporator cover 51. An evaporator 50 is disposed in the interior of the evaporator cover 51. That is, the air suction member 42 is formed in such a manner that the evaporator 50 and the fan 60 can be mounted in the evaporator cover 51, and the evaporator cover 51 can be inserted into the first and second air suction openings 43,43' which are shaped like short channels.

Accordingly, the first and second air suction openings 43,43' directly communicate with the evaporator 50 in the evaporator cover 51, while the space between the air suction member 42 and evaporator cover 51 forms first and second cool-air passages 90,90', guiding the cool air generated by the evaporator 50 to the cool-air discharge member 41. The first and second cool-air passages 90,90' join each other at the upper open end of the cool-air discharge member 41 for communication with the cool-air discharge member 41. By using such a construction, the cool air passing through the evaporator 50 does not mix with the air-introduced from the refrigerating compartment 23.

The upper wall 53 of the evaporator cover 51 slopes gradually down from its center to opposite ends, while the fan 60 is positioned in the center of the upper wall 53 so the cool air passing through the evaporator 50 is naturally drawn towards the fan 60.

In this embodiment, the fan 60 of a radial type is selected, but an axial type fan, like the propeller fan, may be selected.

The cool-air discharge member 41 comprises a blade 70 and a grille 44. The blade 70 is mounted within the cool-air discharge member 41. The grille 44 is attached to the front of the cool-air discharge member 41 and has a plurality of cool-air discharge openings 45.

The blade 70, which is made of a long plate, is twisted several times. A support member 46 is provided above the blade 70 to rotatably support the top 71 of the blade 70. A driving motor 80 is mounted under the blade 70, and is connected to the bottom 71' to rotate the blade 70. The blade 70 may be modified in various shapes, as long as they evenly disperse cool air towards the refrigerating compartment 23. A low-speed motor of 5 to 7 rpm is used as the driving motor 80. It may be further desired that a geared motor or a stepping motor, rotatable in reverse, be used as the driving motor 80. In the case where a plurality of blades are connected in parallel with one driving motor, the cool air would be dispersed more effectively.

The flow direction of the cool air in the cool-air circulating apparatus 40A is indicated as arrows in FIG. 4.

In operation, the air in the refrigerating compartment 23 is introduced into the evaporator cover 51 through the air suction openings 43,43' by the operation of the fan 60. The introduced air, passing through the evaporator 50, is cooled, and then flows along the first and second cool-air passages 90,90'. The cool air is then directed to the cool-air discharge member 41. The cool air in the cool-air discharge member 41 is evenly distributed into the refrigerating compartment 23 through the cool-air discharge openings 45 by means of the blade 70 slowly rotated by the driving motor 80.

Figure 5A:
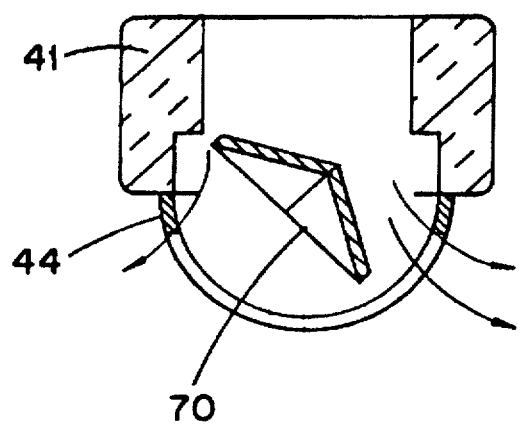
FIGS. 5A,B,C are views taken along the line V—V in FIG. 4, which show the flow directions of the cool air in accordance with the rotation angles of the blade.
Figure 5B:
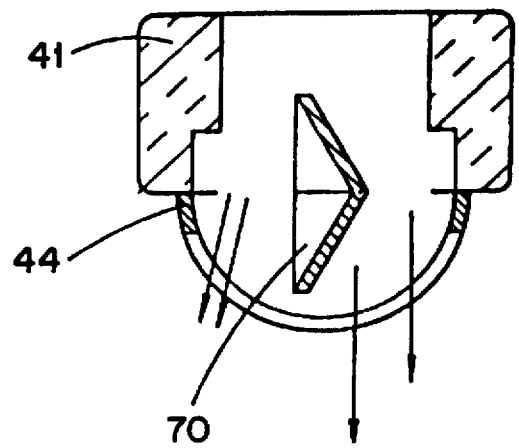
Figure 5C:
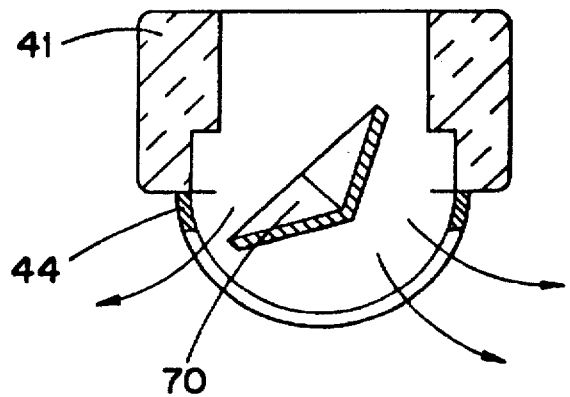

FIGS. 5A,B,C show the flow directions of the cool air according to the rotation angles of the blade 70. As the blade 70 is slowly rotated, the cool air discharges in every direction. Further, this invention can have a means for controlling the position of the blade 70, so that a specific area in the refrigerating compartment 23 is cooled for a fixed period of time.

Figure 7:
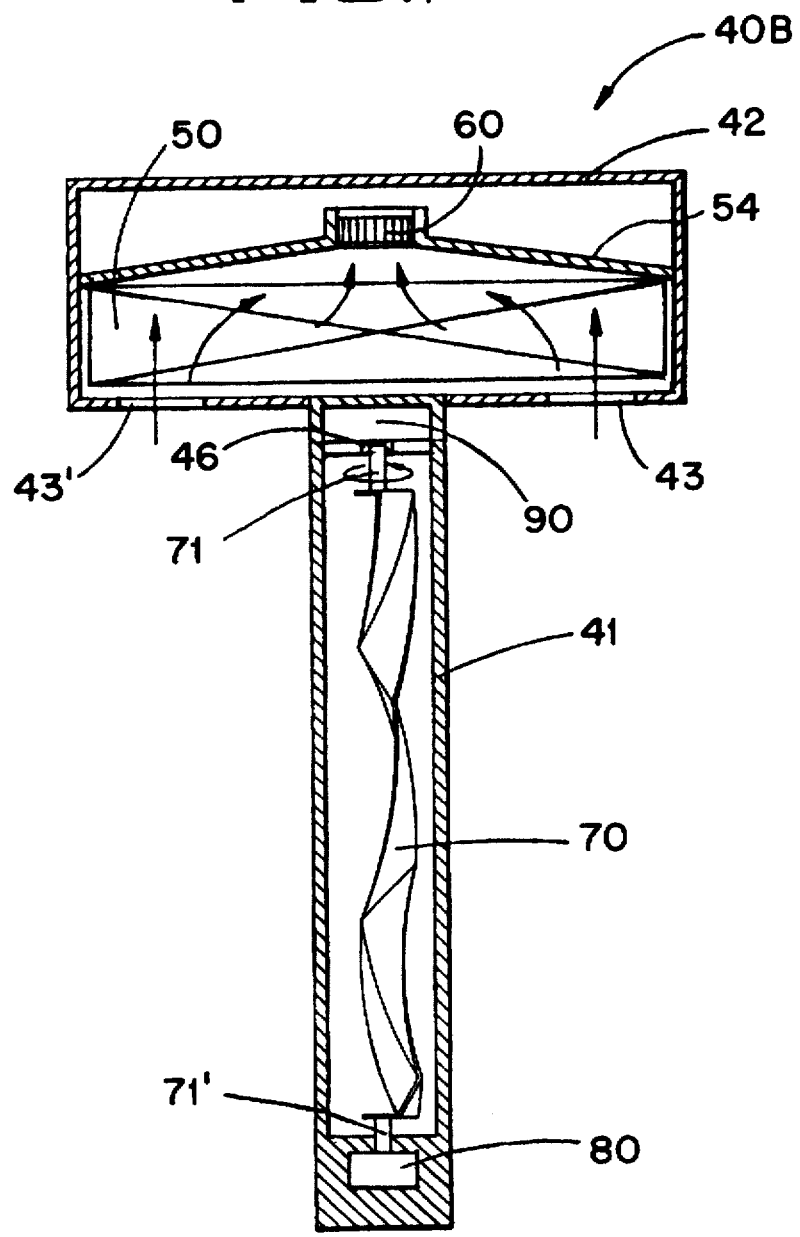
FIG. 7 is a longitudinal cross-sectional view of the cool-air circulating apparatus in FIG. 6.

FIGS. 6 and 7 show a cool-air circulating apparatus 40B according to a second embodiment of this invention.

As shown in FIG. 6, the air suction member 42 is divided into two areas by means of a partition plate 54 which slopes gradually down to opposite ends from the middle portion. The fan 60 is disposed in the middle portion of the partition plate 54. The evaporator 50 is disposed under the partition plate 54, or on the lower portion of the air suction member 42. The air suction openings 43,43' are formed on the right and left sides of the lower wall of the air suction member 42. Further, a cool-air guide duct 91 is provided to connect the air suction member 42 with the cool-air discharge member 41. The one end of the cool-air guide duct 91 is connected to the upper portion of the air suction member 42, while the other end is connected to the upper portion of the cool-air discharge member 41. Accordingly, the air in the refrigerating compartment 23 is directly introduced into the evaporator 50 through the air suction openings 43,43'. The cool air generated by the evaporator 50 flows to the cool-air discharge member 41 through the cool-air guide duct 91. Except for the above description, this embodiment is the same as the first embodiment.

FIGS. 8 to 11 show cool-air circulating apparatuses 40C according to the third embodiment of this invention.

The cool-air circulating apparatuses 40C have a cool-air guide passage 47 in the interior of the air suction member 42 instead of the cool-air guide duct 91 in the second embodiment.

Figure 8:
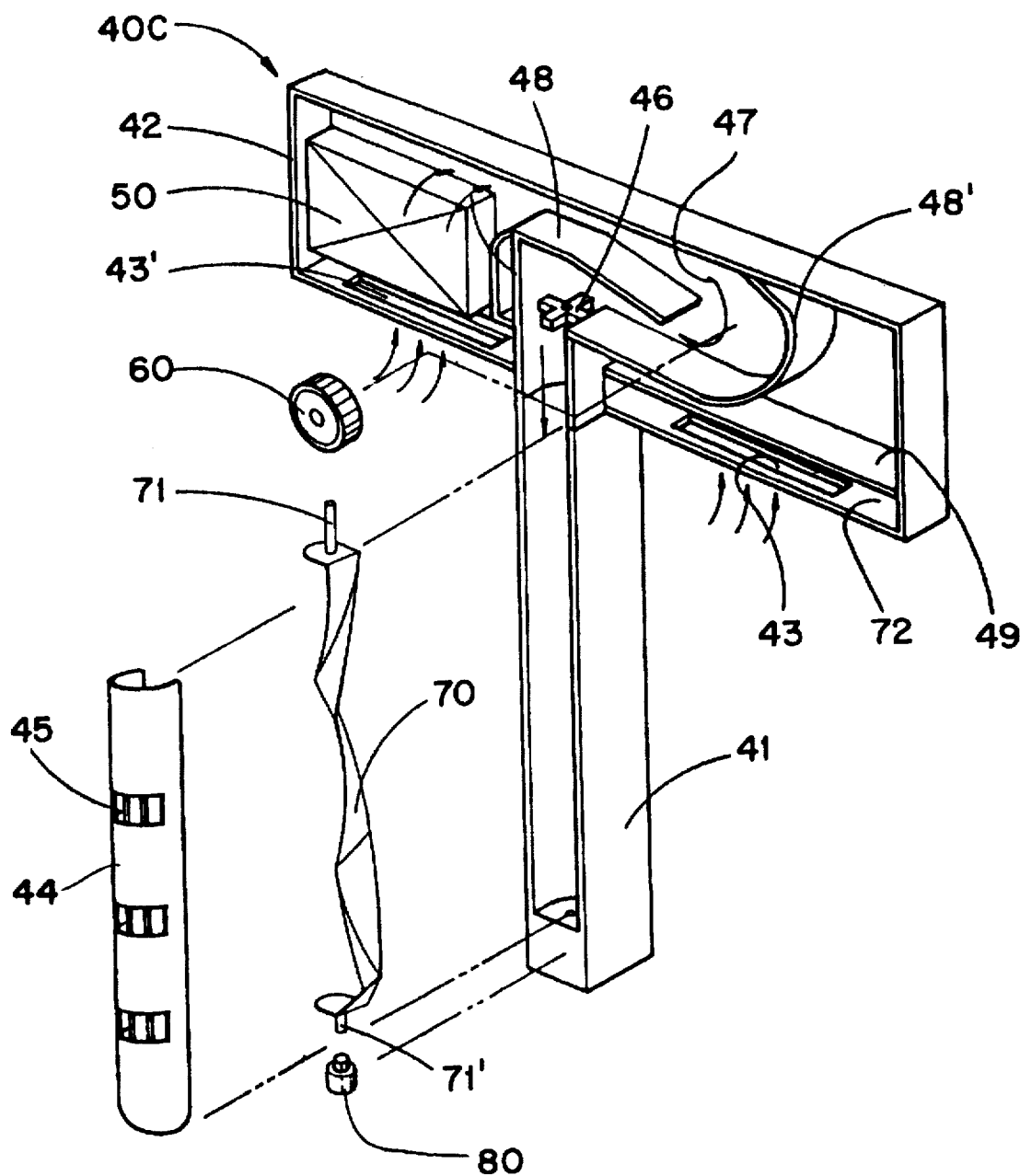
FIGS. 8 to 11 are views showing the third embodiment of this invention, of which show cool-air circulating apparatuses having an air guider in an integrated housing.

In the cool-air circulating apparatus 40C shown in FIG. 8, the air suction member 42 is divided into right and left sides by the cool-air discharge member 41 bisecting the center of the air suction member 42. The first and second air suction openings 43,43' are formed on the right and left sides of the lower wall of the air suction member 42.

The evaporator 50 is disposed in the left side of the air suction member 42 where the second air suction opening 43' is formed. A suction passage 72 is formed inside the first suction opening 43 by a horizontal plate 49 which guides the cool air, introduced through the air suction opening 43, to the evaporator 50.

Further, the cool-air guide passage 47 is formed extending towards the right side from the middle of the air suction member 42 by means of both a first guide plate 48 and a second guide plate 48', which guides the cool air passing through the evaporator 50 to the cool-air discharge member 41. The first guide plate 48 extends outward horizontally towards the right side of the air suction member 42 from the left end of the cool-air discharge member 41. The second guide plate 48', of which one end is connected to the right end of the cool-air discharge member 41 which is smaller in height than the left end of the cool-air discharge member 41, stands face to face with the first guide plate 48 and further extends towards the right side of the air suction member 42. The other end of the second guide plate 48' is curved and connected to the upper end of the air suction member 42. That is, the cool-air guide passage 47 is surrounded by means of the first and second guide plate 48,48'.

A fan 60 of a radial type is mounted in the cool-air guide passage 47. The cool-air discharge member 41 is the same as that in the above embodiments.

The flow of cool air is as follows: the air in the refrigerating compartment 23 is introduced, by the operation of the fan 60, into the evaporator 50 through the air suction openings 43,43'. The cool air generated by the evaporator 50 flows to the cool-air discharge member 41 through the cool-air guide passage 47. The cool air in the cool-air discharge member 41 is distributed evenly into the refrigerating compartment 23 through the cool-air discharge openings 45 by means of the blade 70 slowly rotated by the driving motor 80.

Figure 9:
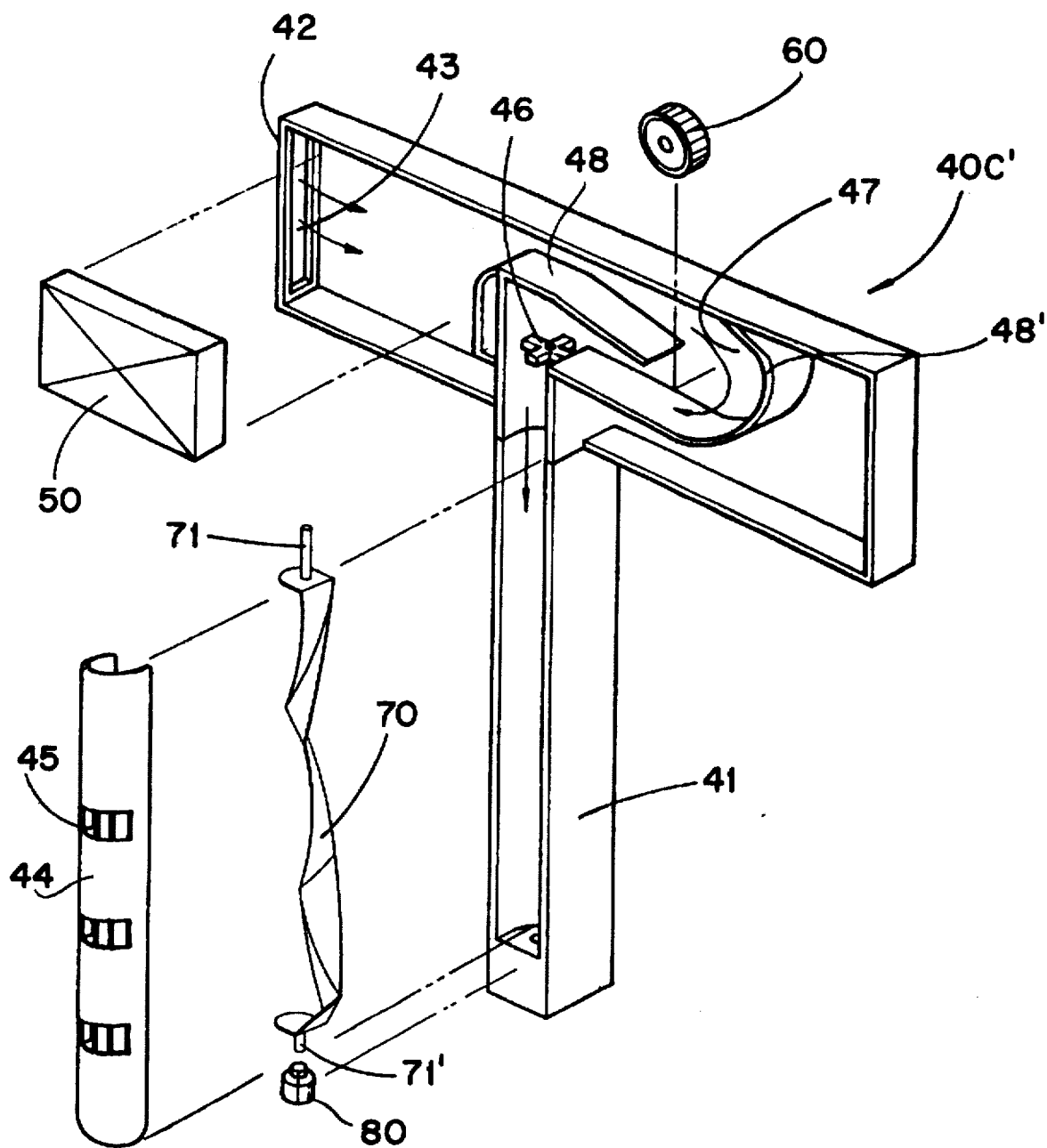

In the cool-air circulating apparatus 40C' shown in FIG. 9, only one air suction opening 43 is formed on the left side wall of the air suction member 42 where the evaporator 50 is mounted, so the air in the refrigerating compartment 23 is introduced through only the left side wall of the air suction member 42. Except for the above description, this cool-air circulating apparatus 40C' is the same as the cool-air circulating apparatus 40C.

Figure 10:
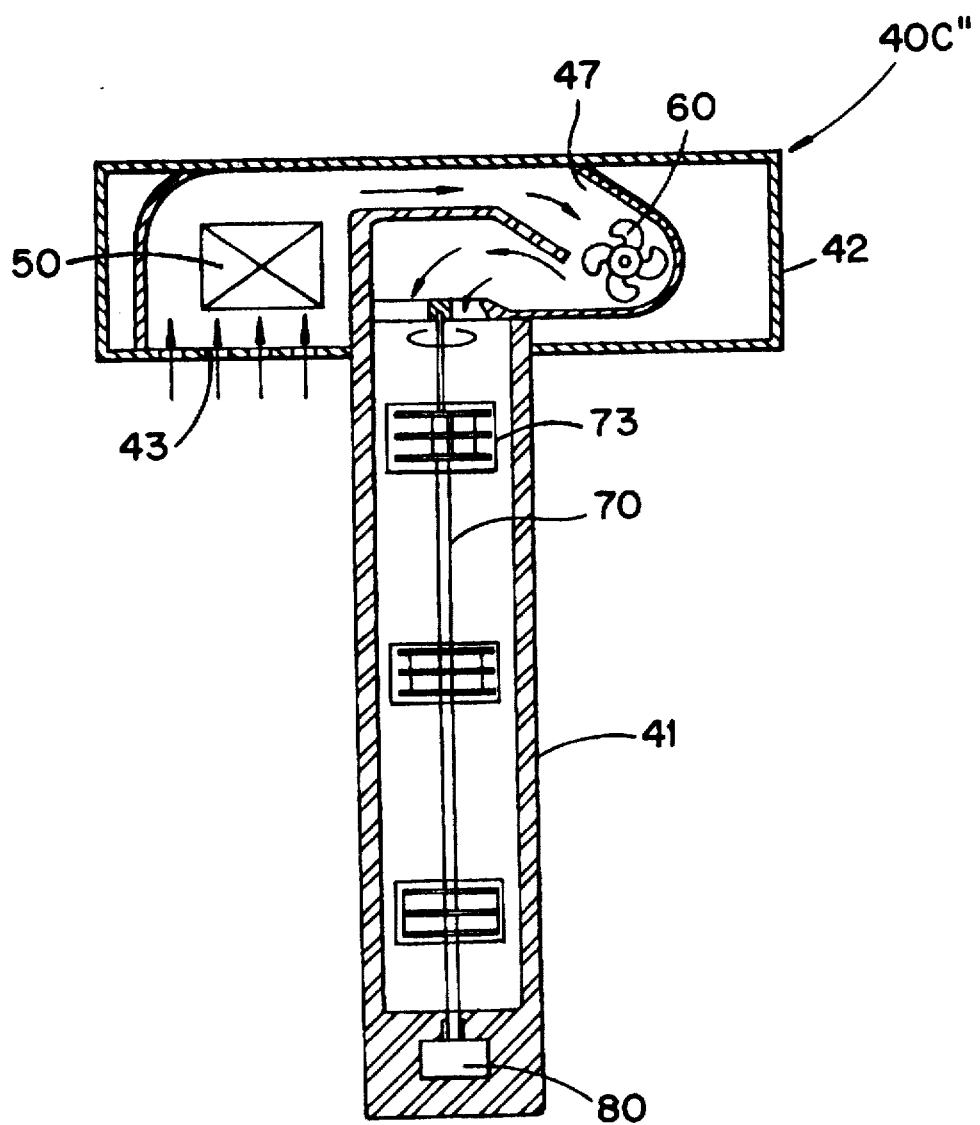

The cool-air circulating apparatus 40C", as shown in FIG. 10, is nearly identical to the cool-air circulating apparatus 40C shown in FIG. 8. The only difference between the two is that the fan 60 consists of a propeller type and a plurality of vanes 73 are arranged at points corresponding to each of the cool-air discharge openings 45, instead of the blade 70 of the twist type.

Figure 11:
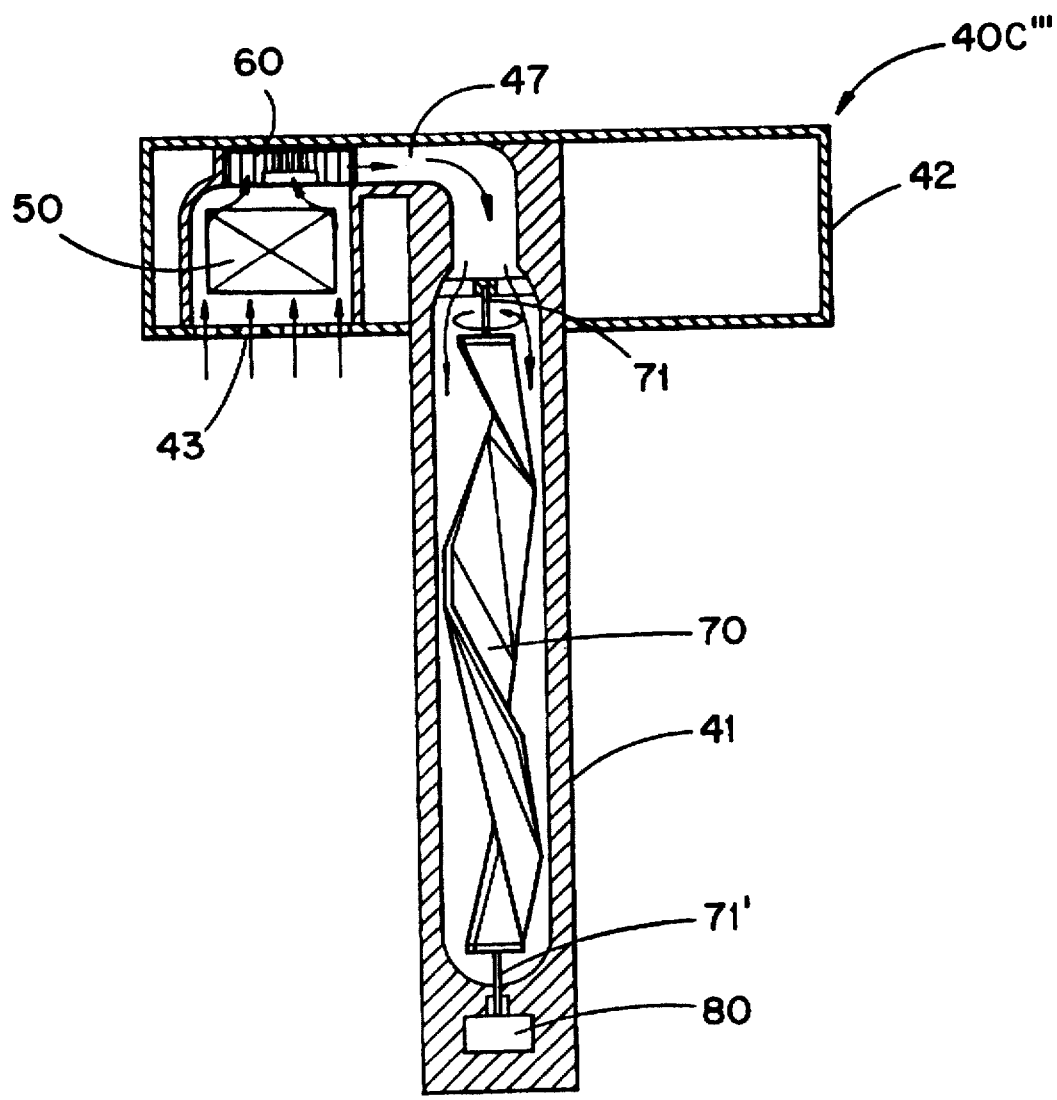

In the cool-air circulating apparatus 40C'" shown in FIG. 11, the evaporator 50 and the fan 60 are disposed on either side of the air suction member 42, with one air suction opening 43, consisting of several holes, provided under the evaporator 50. The cool-air guide passage 47 is formed by connecting the outlet of the fan 60 with the upper end of the cool-air discharge member 41.

FIGS. 12 to 15 show cool-air circulating apparatuses 40D according to the fourth embodiment of this invention.

Figure 12:
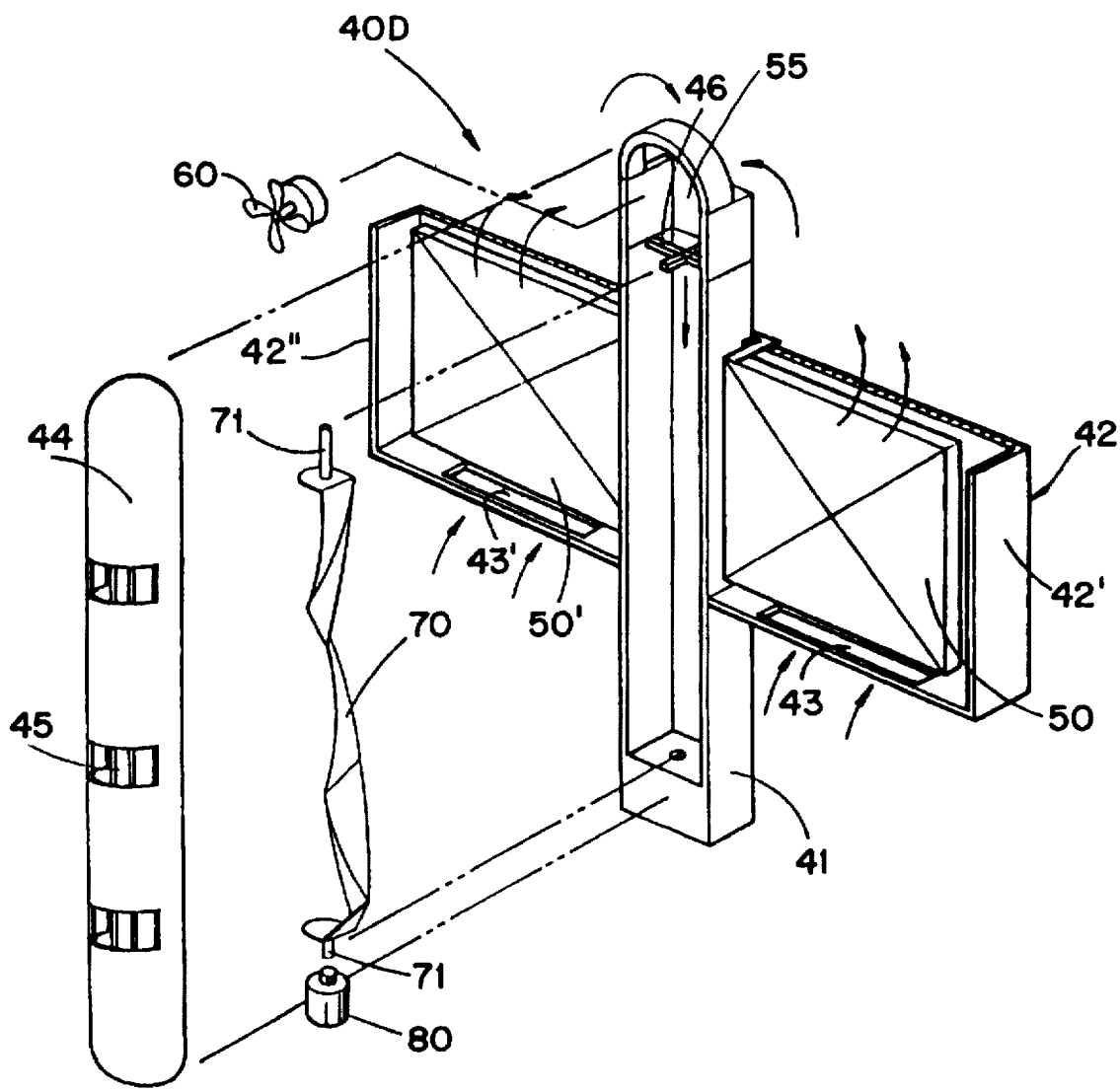
FIGS. 12 to 15 are views showing the fourth embodiment of this invention, of which show cool-air circulating apparatuses having a couple of evaporators in an integrated housing.

The cool-air circulating apparatus 40D, as shown in FIG. 12, comprises a cool-air discharge member 41 formed lengthwise, and first and second air suction portions 42',42" arranged on the right and left sides of the cool-air discharge member 41, respectively. The first evaporator 50 is mounted in the first air suction portion 42', while the second evaporator 50' is mounted in the second air suction portion 42". A couple of air suction openings 43,43' are formed on the lower walls of the air suction portions 42',42", respectively. A cool-air inflow opening 55 is formed on the upper end of the cool-air discharge member 41 for gathering cool air from the opposite evaporators 50,50'. The fan 60 of a propeller type is mounted in the cool-air inflow opening 55. The grille 44, fitted in the front of the cool-air discharge member 41, and the blade 70, of the twist type therein, are the same as those in the first embodiment.

The distinction between this embodiment and the aforementioned embodiments is that in this embodiment the air suction portions 42',42" are completely separated by the cool-air discharge member 41 crossing them, and a couple of evaporators 50,50' are mounted in the air suction portions 42',42".

Therefore, the air introduced from the first air suction opening 43 is cooled when passed through the first evaporator 50, and the air introduced from the second air suction opening 43' is cooled when passed through the second evaporator 50'. The air passing through the evaporators 50,50' join each other in the cool-air inflow opening 55 and then flow down along the cool-air discharge member 41. The cool air in the cool-air discharge member 41 is distributed evenly into the refrigerating compartment 23 through the cool-air discharge openings 45 by means of the blade 70, which is slowly rotated by the driving motor 80. In the cool-air circulating apparatus 40D', as shown in FIG. 13, the first and second evaporator 50,50' are mounted in the first and second air suction portions 42',42", respectively, and are connected to each other by means of a connecting refrigerant tube 56.

Figure 13:
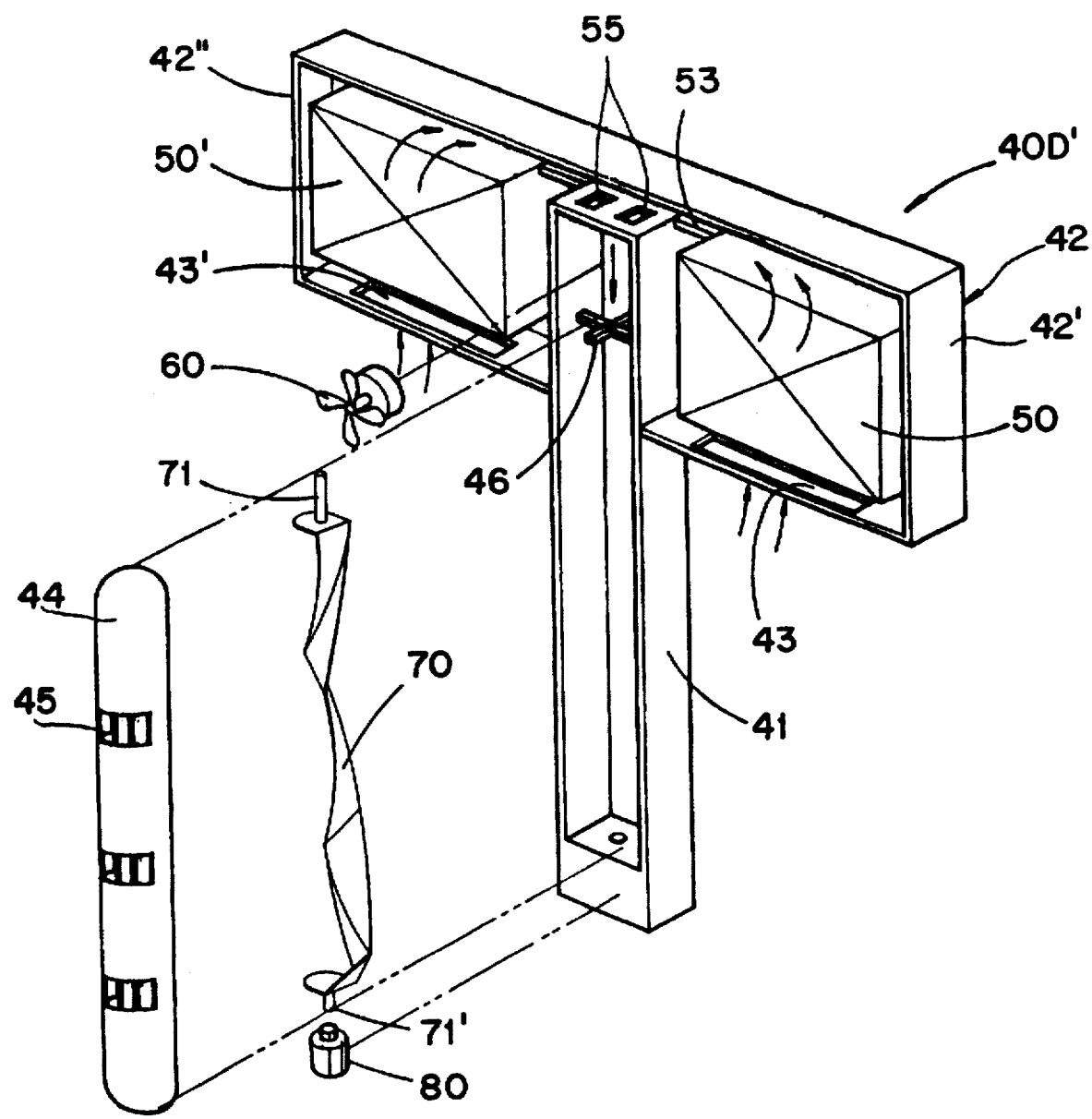
Figure 14:
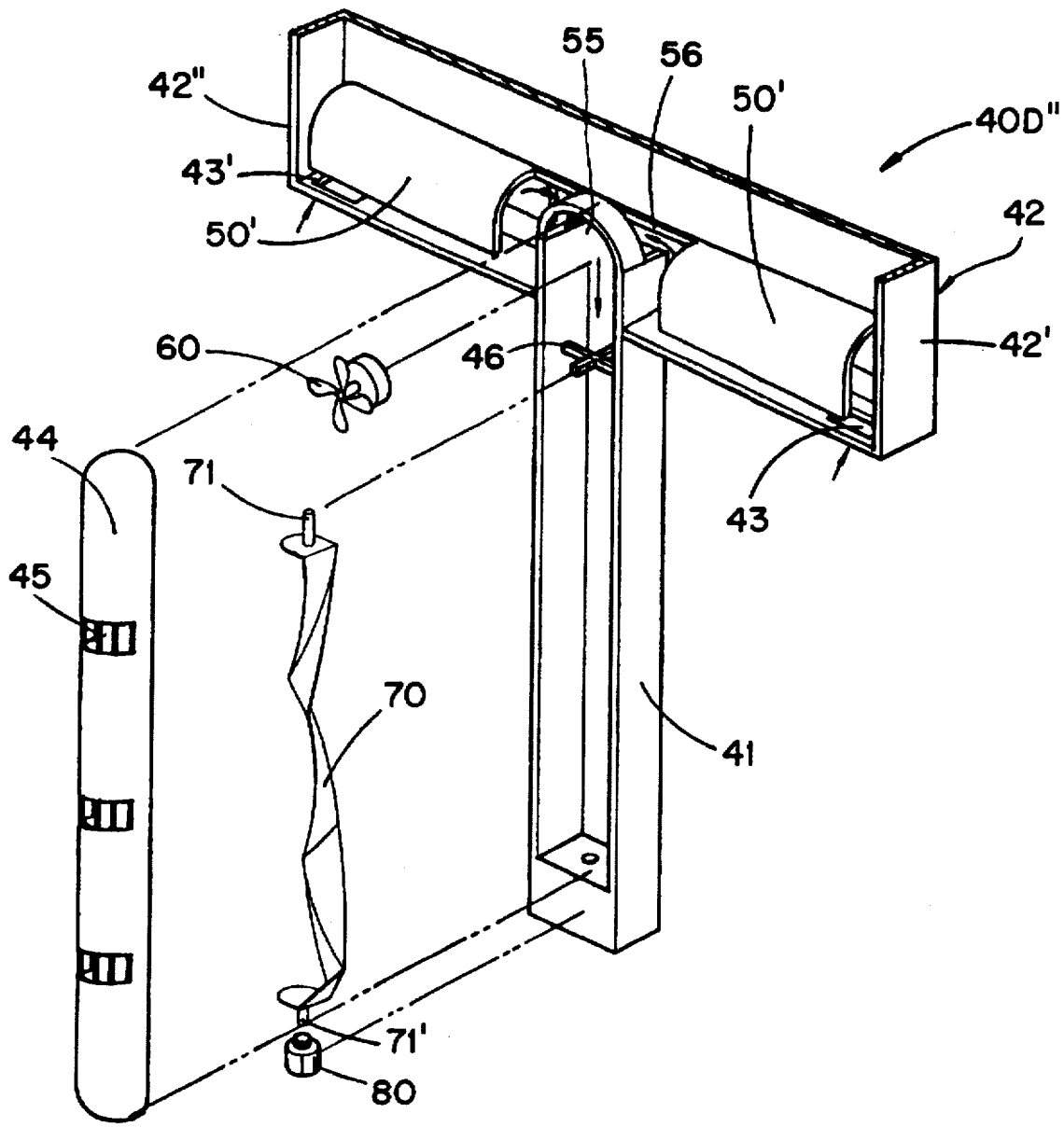

The cool-air circulating apparatus 40D" in FIG. 14 shows a modified example of the cool-air circulating apparatus 40D' in FIG. 13. In the cool-air circulating apparatus 40D" a couple of evaporators 50,50' are formed in a 'U' shape. Accordingly, the size of the air suction member 42 in this embodiment becomes smaller, compared with those of the other embodiments.

Figure 15:
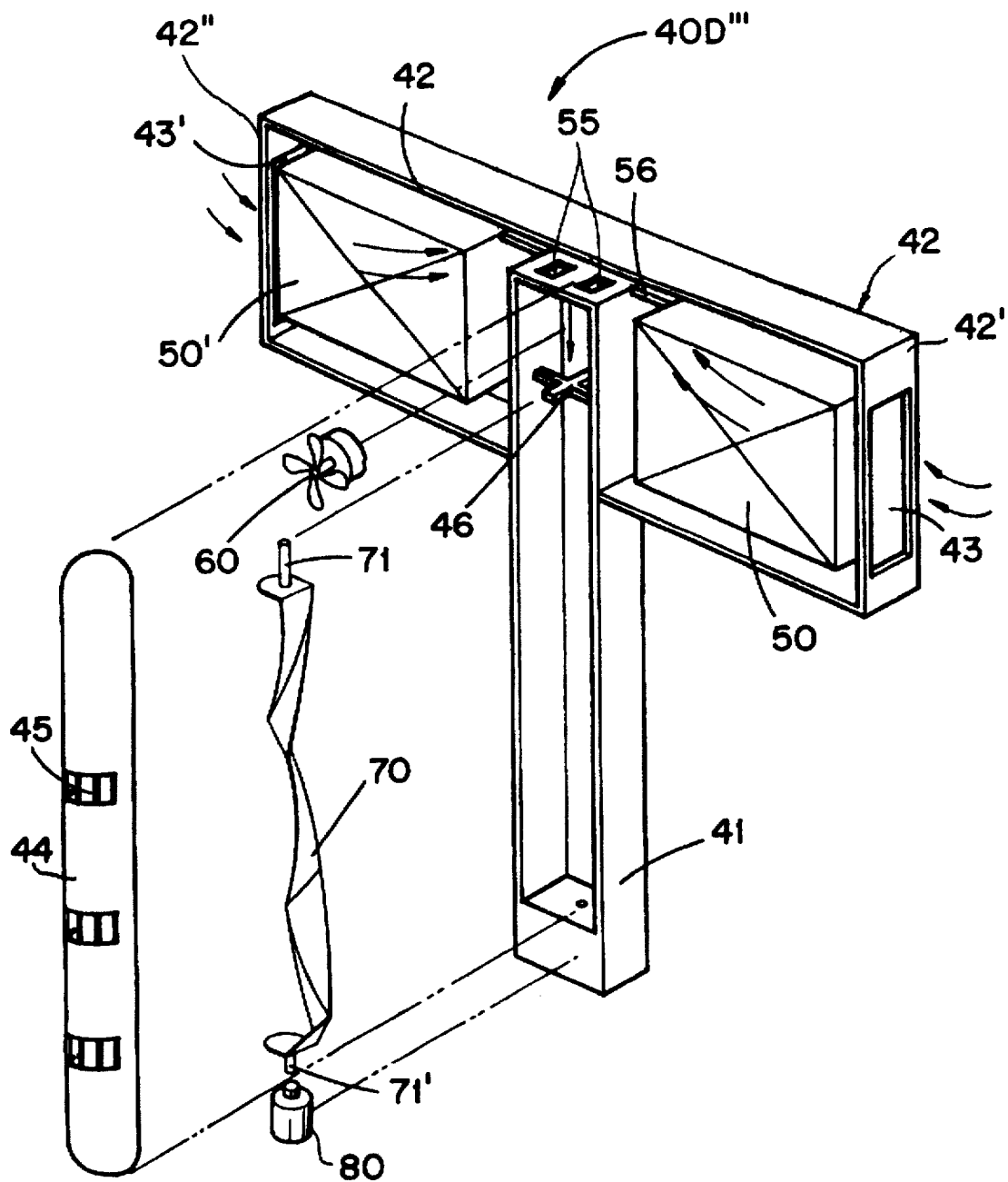

In the cool-air circulating apparatus 40D'", as shown in FIG. 15, the air suction openings 43,43' are disposed on the side walls of the air suction portions 42',42", respectively, instead of the lower wall. Except for the location of the air suction openings 43,43', this cool-air circulating apparatus 40D'" is identical to the cool-air circulating apparatuses 40D,D',D" shown in FIGS. 12 to 14, so further description will be omitted.

Figure 16:
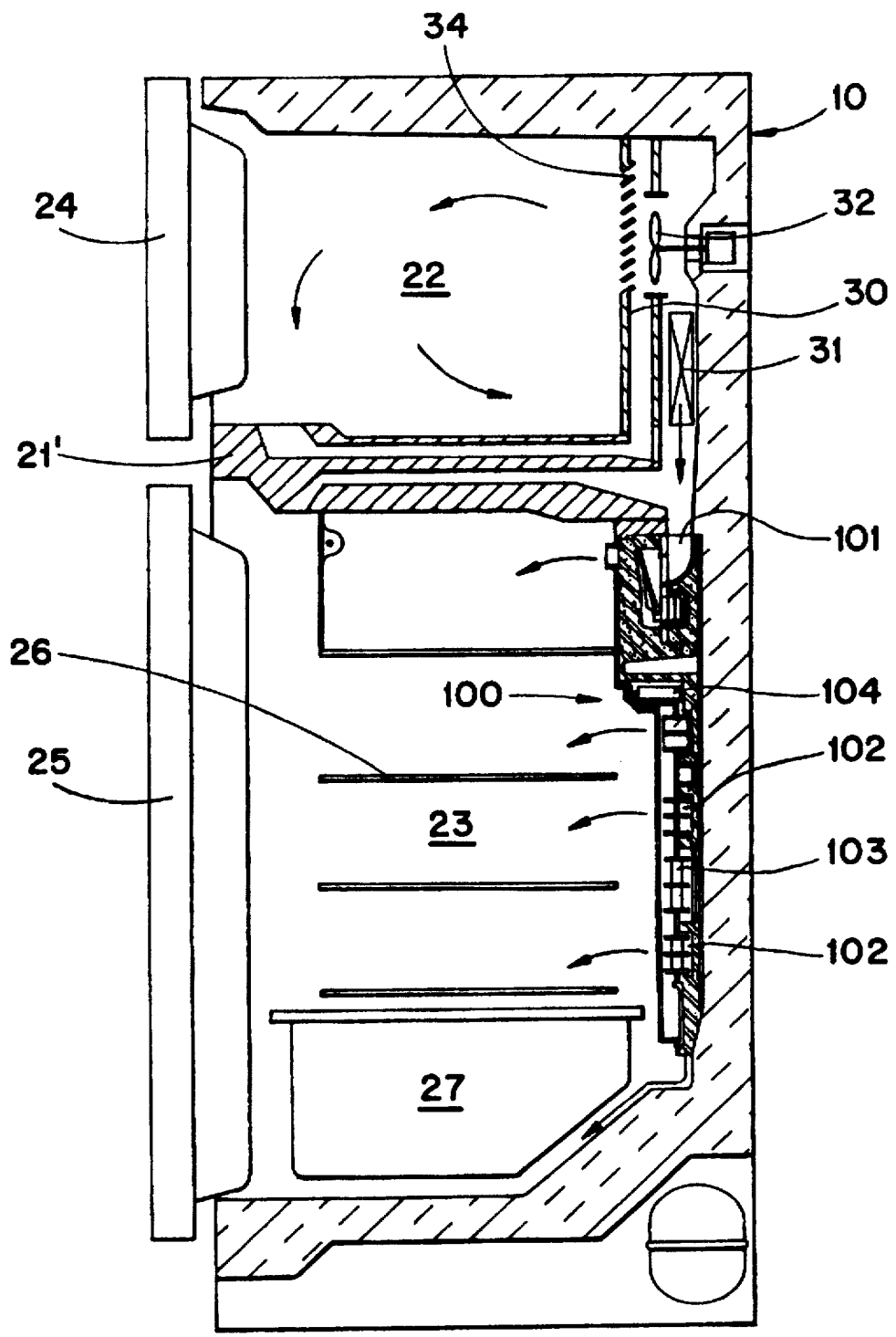
FIGS. 16 and 17 show refrigerators having cool-air ducts of another housing construction, to which the above embodiments are adapted.
Figure 17:
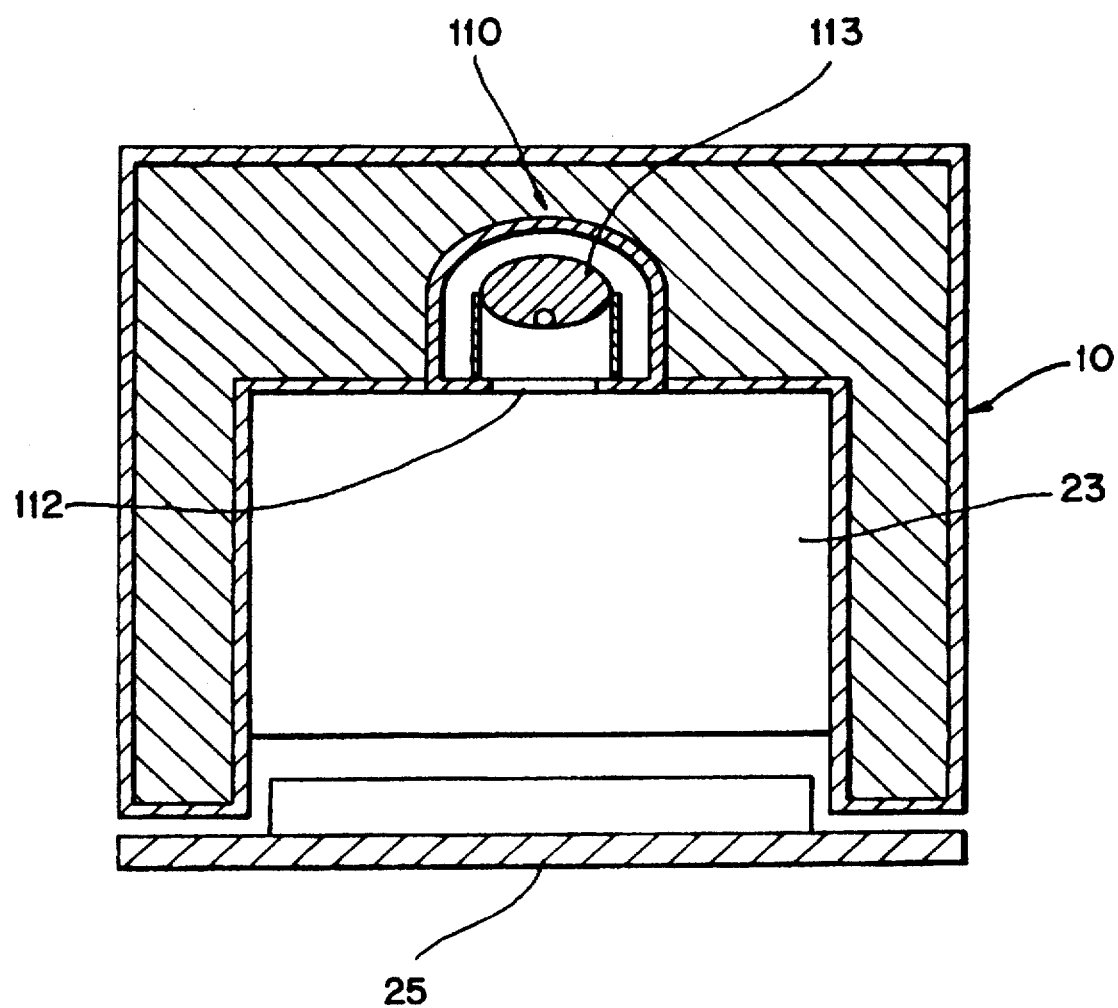

FIGS. 16 and 17 illustrate the interior of refrigerators to which the above cool-air circulating apparatuses 40A,B,C,D can be adapted.

The refrigerator of FIG. 16 comprises; a body 10 including the freezing and refrigerating compartments 22,23 which are separated from each other by means of ah intermediate wall 21'; a evaporator 31 and a fan 32; a housing 100 for guiding the cool air, generated by the evaporator 31, to the refrigerating compartment 23.

The housing 100 includes an cool-air inlet 101, a cool-air passage(not shown), a plurality of cool-air discharge openings 102, a plurality of rotating vanes 103 for controlling the discharge direction of cool air, and a driving motor 104 for rotating the vanes 103.

In the refrigerator shown in FIG. 16, cool air is supplied to the freezing and refrigerating compartments 22,23 by use of a common evaporator 31 and fan 32, as in a conventional refrigerator. In the case that the cool-air circulating apparatuses 40 are applied to such a refrigerator, the same operation and effect as those in the above embodiments can be acquired. That is, if the intermediate wall 21' is formed such that the freezing and refrigerating compartments 22,23 are completely separated from each other, like the intermediate wall 22 in FIG. 2, and the evaporator 50 and fan 60 for the refrigerating compartment 23 are disposed on the upper portion of the housing 100, so as to be the same as the air suction member 42 according to this invention, the housing 100 will work like the cool-air circulating apparatuses 40 described above. As shown in FIG. 16, the lower portion of the housing 100, where the rotating vanes 103 and cool-air discharge openings 102 are arranged, has a similar construction as the cool-air discharge member 41 of the cool-air circulating apparatuses 40.

Accordingly, the construction of the housing 100 shown in FIG. 16 can be included in the scope of this invention.

FIG. 17 illustrates a partial transverse section of a refrigerator of which another housing 110 for the refrigerating compartment 23 is mounted. The housing 110 is mounted on the rear wall of the refrigerating compartment 23. An elliptical blade 113 is mounted in the housing 110 and a plurality of cool-air discharge openings 112 are formed on the front of the housing 110.

The housing 110 can also function as a cool-air circulating apparatus. That is, if the air suction member 42, according to this invention, is mounted on the upper portion of the housing 110, it will work like the cool-air circulating apparatuses 40 described above. That is because the housing 110 has a similar construction to that of the cool-air discharge member 41 of the cool-air circulating apparatuses 40. Accordingly, the construction of the housing 110, shown in FIG. 17, can be included in the scope of this invention.

As described in detail above, the cool-air circulating apparatuses, according to this invention, can easily be installed in a refrigerator because they consist of an integrated housing construction.

Further, the cool-air-circulating apparatuses are free to be adjusted, according to the volume and use of one compartment, because they are used only for one compartment.

This invention is especially useful for large-sized refrigerators, where the volumes of the freezing and refrigerating compartments are large, because it is possible to individually provide cool-air circulating apparatuses suitable for the volume and use of each compartment.

In addition, any compartment in which one of the cool-air circulating apparatuses is mounted will be maintained at an uniform temperature because the cool air is distributed evenly into the compartment through each cool-air discharge opening by means of the blade rotating slowly.

What is claimed is:

1. A refrigerator comprising;
   freezing and refrigerating compartments which are completely separated from each other by means of an intermediate wall;
   a first evaporator for cooling air and a first fan mounted on a rear side of said freezing compartment for circulating the cool air to said freezing compartment; the first evaporator and first fan being isolated from the refrigerating compartment;
   a freezing compartment door and a refrigerating compartment door mounted on the front of each compartment for opening/closing said freezing and refrigerating compartments;
   and a cool-air circulating apparatus comprising a housing mounted on a rear wall of said refrigerating compartment for circulating cool air to said refrigerating compartment,
   said housing comprising an air suction member extending outward horizontally and a cool-air discharge member extending downward from about the middle of said air suction member,
   said air suction member including at least one air suction opening formed in a surface thereof, at least one second evaporator mounted in said air suction member for cooling air, a second fan mounted on said air suction member for circulating the air cooled by said second evaporator to said refrigerating compartment, the second evaporator and second fan being isolated from the freezing compartment,
   said cool-air discharge member including a grille mounted on a front portion thereof and a blade disposed lengthwise in the interior thereof, said grille having a plurality of cool-air discharge openings formed in an up-and-down direction on a front of said grille, said blade arranged for distributing the cool air cooled by said second evaporator to the respective discharge openings.

2. A refrigerator according to claim 1, wherein said blade is rotatable, said second evaporator is disposed in the air suction member of said cool-air circulating apparatus, and surrounded by an evaporator cover disposed within a space created inside said air suction member, said air suction openings are connected from the right and left sides of the lower wall of said air suction member to the right and left sides of the lower wall of said evaporator cover, respectively, and said second fan is disposed in the upper portion of said evaporator cover,
   said air suction member communicating with said cool-air discharge member through the space formed between said evaporator cover and said air suction member,
   whereby the air in said refrigerating compartment is introduced into said air suction member through said air suction openings by the operation of said second fan and cooled by passing through said second evaporator, and then flowing to said cool-air discharge member through said space and distributed evenly again into said refrigerating compartment through said cool-air discharge openings by rotation of said blade.

3. A refrigerator according to claim 1, wherein said second evaporator is disposed under a partition plate which divides said air suction member of said cool-air circulating apparatus into upper and lower portions,
   said air suction openings are formed on the right and left sides of the lower wall of said air suction member, respectively,
   said second fan is disposed in the middle of said partition plate,
   said air suction member communicating with said cool-air discharge member by a guide channel that connects the upper portion of said air suction member to the upper portion of said cool-air discharge member,
   whereby the air in said refrigerating compartment is introduced into said air suction member through said air suction openings by the operation of said second fan and cooled by passing through said second evaporator, and then flowing to said cool-air discharge member through said guide channel and is distributed evenly again into said refrigerating compartment through said cool-air discharge openings by rotation of said blade.

4. A refrigerator according to claim 1, wherein said second evaporator is disposed on either one of the right or left sides of said air suction member of said cool-air circulating apparatus, said air suction opening 43 is formed on the lower wall of said air suction member of which said second evaporator is disposed, said second fan is disposed on the opposite side of said second evaporator in said air suction member, a cool-air guide passage extends downwards from the upper end of said air suction member to the top end of said cool-air discharge ember, and curving towards the opposite side of said second evaporator, said second fan being surrounded by said cool-air guide passage, whereby the air in said refrigerating compartment is introduced into said air suction member through said air suction opening by the operation of said second fan and cooled by passing through said second evaporator, and then flowing to said cool-air discharge member through said cool-air guide passage and distributed evenly again into said refrigerating compartment through said cool-air discharge openings by rotation of said blade.

5. A refrigerator according to claim 1, wherein said second evaporator is disposed on either one of the right or left sides of said air suction member of said cool air circulating apparatus, said air suction openings are formed on the right and left side of the lower wall of said air suction member, respectively, said second fan is disposed on the opposite side of said evaporator in said air suction member, a cool-air guide passage extends downwards from the upper end of said air suction member to the top end of said cool-air discharge member, and curving towards the opposite side of said second evaporator, said fan being surrounded by said cool-air guide passage, whereby the air in said refrigerating compartment is introduced into said air suction member through aid air suction openings by the operation of said second fan and cooled by passing through said second evaporator, and then flowing to said cool-air discharge member through said cool-air guide passage and distributed evenly again into said refrigerating compartment through said cool-air discharge openings 45 by rotation of said blade.

6. A refrigerator according to claim 1, wherein said cool-air discharge member of said cool-air circulating apparatus extends upwards to the upper portion of said air suction member and divides said air suction member into two sections, a cool-air inflow opening being formed on the top end of said cool-air discharge member, said air suction member is divided into first and second air suction portions by the upper portion of said cool-air discharge member, there being two said second evaporators disposed in said first and second air suction portions, respectively, said air suction openings are formed on the lower walls of said first and second air suction portions, respectively, said second fan is disposed in said cool-air inflow opening, whereby the air in said refrigerating compartment is introduced into said air suction member through said air suction openings by the operation of said second fan and cooled by passing through said second evaporators, and then flowing to said cool-air discharge member through said cool-air inflow opening and distributed evenly again into said refrigerating compartment through said cool-air discharge openings by rotation of said blade.

7. A refrigerator according to claim 6, wherein said second evaporators are mounted spaced from each other in said first and second air suction portions respectively, of said cool-air circulating apparatus, while connected to each other by means of a connecting refrigerant tube.

8. A refrigerator according to claim 1, wherein said cool-air discharge member of said cool-air circulating apparatus extends upwards to the upper portion of said air suction member and divides said air suction member into two sections, with at least one or more cool-air inflow opening being formed on the top end of said cool-air discharge member, said air suction member is divided into first and second air suction portions by the upper portion of said cool-air discharge member, there being two said second evaporators disposed in said first and second air suction portions, respectively, said air suction openings are formed on the side walls of said first and second air suction portions,respectively, said second fan is disposed in said cool-air inflow opening, whereby the air in said refrigerating compartment is introduced into said air suction member through said air suction openings by the operating of said second fan and cooled by passing through said second evaporators, and then flowing to said cool-air discharge member through said cool-air inflow opening and distributed evenly again into said refrigerating compartment through said cool-air discharge openings by rotation of said blade.

9. A refrigerator according to claim 8, wherein said second evaporators are mounted spaced from each other in said first and second air suction portions, respectively, while connected to each other by means of a connecting refrigerant tube.

10. A refrigerator according to claim 1 wherein the blade is rotatable about a vertical axis, and further including a motor connected to said blade for rotating said blade about said axis.

* * * * *